US008474020B2

(12) United States Patent
Hamachi

(10) Patent No.: US 8,474,020 B2
(45) Date of Patent: Jun. 25, 2013

(54) USER AUTHENTICATION METHOD, WIRELESS COMMUNICATION APPARATUS, BASE STATION, AND ACCOUNT MANAGEMENT APPARATUS

(75) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/812,748

(22) PCT Filed: Mar. 23, 2009

(86) PCT No.: PCT/JP2009/056405
§ 371 (c)(1),
(2), (4) Date: Jul. 13, 2010

(87) PCT Pub. No.: WO2009/123074
PCT Pub. Date: Oct. 8, 2009

(65) Prior Publication Data
US 2010/0299730 A1  Nov. 25, 2010

(30) Foreign Application Priority Data
Apr. 1, 2008  (JP) .................................. 2008-095432

(51) Int. Cl.
*G06F 21/00* (2006.01)

(52) U.S. Cl.
USPC .............................................. 726/5; 713/171

(58) Field of Classification Search
USPC .............................................. 713/171; 726/5
See application file for complete search history.

(56) References Cited

U.S. PATENT DOCUMENTS

| 5,596,641 | A | 1/1997 | Ohashi et al. |
| 7,010,688 | B1 | 3/2006 | Kawasaki |
| 8,194,589 | B2 | 6/2012 | Wynn et al. |
| 2002/0046092 | A1* | 4/2002 | Ostroff ........................ 705/14 |
| 2005/0262481 | A1* | 11/2005 | Coulson ........................ 717/120 |
| 2006/0041751 | A1* | 2/2006 | Rogers et al. .................. 713/171 |
| 2007/0088951 | A1* | 4/2007 | Nakajima ..................... 713/171 |

FOREIGN PATENT DOCUMENTS

| JP | 7-307982 A | 11/1995 |
| JP | 2000-196588 A | 7/2000 |

(Continued)

OTHER PUBLICATIONS

Japanese Office Action dated Nov. 19, 2012 issued in corresponding Japanese Patent Application No. 2008-95432.

(Continued)

*Primary Examiner* — Farid Homayounmehr
*Assistant Examiner* — Lisa Lewis
(74) *Attorney, Agent, or Firm* — Fitzpatrick, Cella, Harper & Scinto

(57) ABSTRACT

A wireless communication apparatus transmits a user identifier to an account management apparatus through a communication apparatus. The account management apparatus generates code generation information, and generates code information using authentication information that corresponds to the user identifier and the code generation information. The account management apparatus transmits the code information and the code generation information to the communication apparatus. The communication apparatus sets code information, and transmits the code generation information to the wireless communication apparatus. The wireless communication apparatus generates code information using the code generation information and the authentication information, and when wireless network parameters are set, notifies the account management apparatus of success of authentication. The account management apparatus performs a process to permit the wireless communication apparatus to connect to a communication network.

6 Claims, 12 Drawing Sheets

FOREIGN PATENT DOCUMENTS

| | | |
|---|---|---|
| JP | 2002-55955 A | 2/2002 |
| JP | 2004-80138 A | 3/2004 |
| JP | 2005-269571 A | 9/2005 |
| JP | 2006-295961 A | 10/2006 |
| JP | 2007-310738 A | 11/2007 |
| JP | 2010-503318 A | 1/2010 |
| WO | 2008/030526 A2 | 3/2008 |

OTHER PUBLICATIONS

Japanese Office Action dated Aug. 27, 2012 issued in Japanese Patent Application No. 2008-095432.

"Wireless LAN Installation Strategy-Installation: Configuration is Easier Than You Think", Nikkei Personal Computing, Nikkei Business Publications Inc., Oct. 8, 2007, No. 539, pp. 54-58.

* cited by examiner

USER AUTHENTICATION METHOD, WIRELESS COMMUNICATION APPARATUS, BASE STATION, AND ACCOUNT MANAGEMENT APPARATUS

This application is a National Stage application under 35 U.S.C. §371 of International Application No. PCT/JP2009/056405 filed on Mar. 23, 2009, which claims priority to Japanese Application No. 2008-095432, filed on Apr. 1, 2008, the contents of each of the foregoing applications being incorporated by reference herein.

TECHNICAL FIELD

The present invention relates to a wireless parameter setting technique and a user authentication technique.

BACKGROUND ART

When using an IEEE 802.11 wireless LAN, users must set wireless parameters such as a network identifier (ESSID), a frequency channel, an encryption scheme, an encryption key, an authentication scheme, an authentication key, and the like. Because these settings operations are complicated, methods have been proposed for automatically setting wireless parameters between terminals. For example, a method for transferring wireless parameter settings between a relay station (access point) and a terminal station (station) from the access point to the station with a simple operation has been implemented as an actual product.

In recent years, an organization called the Wi-Fi Alliance has developed a standard for automatic setting of wireless parameters called Wi-Fi Protected Setup (WPS), which has already been implemented in some products.

According to WPS, wireless parameters are provided from a Registrar to an Enrollee using a Registration protocol, a special protocol for setting wireless parameters. The Registrar is an apparatus that manages wireless parameters and provides wireless parameters to Enrollees. The Enrollee is an apparatus that receives wireless parameters from a Registrar.

The communication between the Registrar and the Enrollee according to the Registration protocol is performed using EAP (Extensible Authentication Protocol) packets. The EAP packets are packets that enable communication between the Registrar and the Enrollee without an encryption or authentication.

An example will be described in which wireless parameters are provided from an access point that acts as a Registrar to a station that acts as an Enrollee. First, the station searches for a network to which the access point belongs, and temporarily joins the network. At this point in time, the ESSIDs and frequency channels of the access point and the station are the same, but the encryption key, authentication key and the like are not the same, and thus, ordinary data communication using an encryption or authentication is not possible.

The access point and the station perform transmission/reception of messages using EAP packets according to the Registration protocol, and thereby, wireless parameters are provided from the access point to the station. The provided wireless parameters are newly set in the station, and thereby, data communication using an encryption or authentication is established between the station and the access point.

Currently, public wireless LANs are available which provide Internet connection services by installing access points in public places such as fast-food restaurants, railway stations, airports, and the like. Such a public wireless LAN authenticates users (performs user authentication) using authentication information, such as user IDs and passwords, in order to check whether or not they have an authorized account, and permits only users who have an authorized account to access the Internet. However, this user authentication has to be executed each time a user uses the public wireless LAN, which is troublesome for the user. To address this, for example, Japanese Patent Laid-Open No. 2004-80138 proposes a method for automating user authentication, wireless connection to a public wireless LAN, and the like.

According to the WPS, a PIN code is set in the Registrar and the Enrollee, and if it is confirmed that the PIN code set in the Registrar and the Enrollee are the same in the Registration protocol, wireless parameters are exchanged. So, this system does not permit the exchange of wireless parameters with unintended devices.

Nevertheless, a case can be conceived in which the WPS is applied to a public wireless LAN. However, since general users cannot operate access points, it is impossible to set a PIN code in the Registrars, so the application of the WPS to a public wireless LAN is not possible.

Likewise, when a configuration is adopted in which general users can set a PIN code in access points, even users who do not have an authorized account can easily set a PIN code and obtain the wireless LAN parameters, causing problems in terms of security.

In addition, in public wireless LANs, after the wireless parameters have been set, user authentication has to be performed manually or with dedicated software, requiring users to perform troublesome operations.

DISCLOSURE OF INVENTION

The present invention provides a user authentication method of improving user operability by ensuring that user authentication is successfully completed by setting code information generated using authentication information in a base station apparatus and a wireless communication apparatus, and acquiring wireless parameters using the code information.

According to one aspect of the present invention, there is provided a user authentication method in a communication system comprising a wireless communication apparatus, a base station that performs wireless communication with the wireless communication apparatus, and an account management apparatus that manages user account information of a user permitted to connect to a communication network, the method comprising: at the wireless communication apparatus, transmitting a user identifier that is used to determine whether or not to permit a connection to the communication network to the account management apparatus through the base station; at the account management apparatus, generating code information that is used to set a wireless parameter for performing wireless communication between the wireless communication apparatus and the base station, based on authentication information that corresponds to the user identifier transmitted from the wireless communication apparatus and code generation information, and transmitting the generated code information and the code generation information to the base station; at the base station, storing the code information transmitted from the account management apparatus and transmitting code generation information to the wireless communication apparatus; at the wireless communication apparatus, generating code information based on the code generation information transmitted from the base station and the authentication information corresponding to the user identifier transmitted to the account management apparatus; at the base station, checking whether or not the stored code information and the code information generated by the wireless communication apparatus match, and providing the wireless parameter to the wireless communication apparatus and notifying the account management apparatus of success in setting the wireless parameter, when it is confirmed that the stored code information and the code information generated by the wireless communication apparatus match; and at the account management apparatus, permitting the wireless communication apparatus to connect to the communication network, when success in setting the wireless parameters is notified from the base station.

According to another aspect of the present invention, there is provided a wireless communication apparatus that connects to a communication network through a wireless network, the apparatus comprising: a transmission unit that transmits a user identifier that is used to determine whether or not to permit a connection to the communication network to an account management apparatus through a base station; a reception unit that receives code generation information transmitted from the account management apparatus through the base station; a generation unit that generates code information using the received code generation information and authentication information that corresponds to the user identifier transmitted to the account management apparatus; and an acquisition unit that acquires a parameter of the wireless network from the base station by using the generated code information.

According to still another aspect of the present invention, there is provided a base station that performs wireless communication with a wireless communication apparatus, the base station comprising: a reception unit that receives a user identifier that is used to determine whether or not to permit a connection to a communication network from the wireless communication apparatus; a transfer unit that transfers the user identifier to an account management apparatus; an acquisition unit that acquires, from the account management apparatus, code information that is used to set a wireless parameter for performing wireless communication between the wireless communication apparatus and the base station, and code generation information; a transmission unit that transmits the acquired code generation information to the wireless communication apparatus; a checking unit that checks whether or not code information generated based on the code generation information by the wireless communication apparatus and the code information acquired from the account management apparatus match; a provision unit that provides the wireless parameter to the wireless communication apparatus when it is confirmed that the generated code information and the acquired code information match; and a notification unit that notifies the account management apparatus of success in setting the wireless parameter, when it is confirmed that the generated code information and the acquired code information match.

According to yet another aspect of the present invention, there is provided an account management apparatus that manages user account information of a user permitted to connect to a communication network, the apparatus comprising: a reception unit that receives a user identifier that is used to determine whether or not to permit a connection to the communication network from a wireless communication apparatus through a base station; a generation unit that generates code information that is used to set a wireless parameter for performing wireless communication between the wireless communication apparatus and the base station using authentication information that corresponds to the user identifier and code generation information; a transmission unit that transmits the code information and the code generation information to the base station; a reception unit that receives a success notification indicating success in setting the wireless parameters from the base station; and a permitting unit that permits the wireless communication apparatus to connect to the communication network when the success notification is received.

Further features of the present invention will become apparent from the following description of exemplary embodiments with reference to the attached drawings.

BEST MODE FOR CARRYING OUT THE INVENTION

Hereinafter, best modes for carrying out the invention will be described in detail with reference to the attached drawings of the present invention.

Embodiment 1

Figure 1:
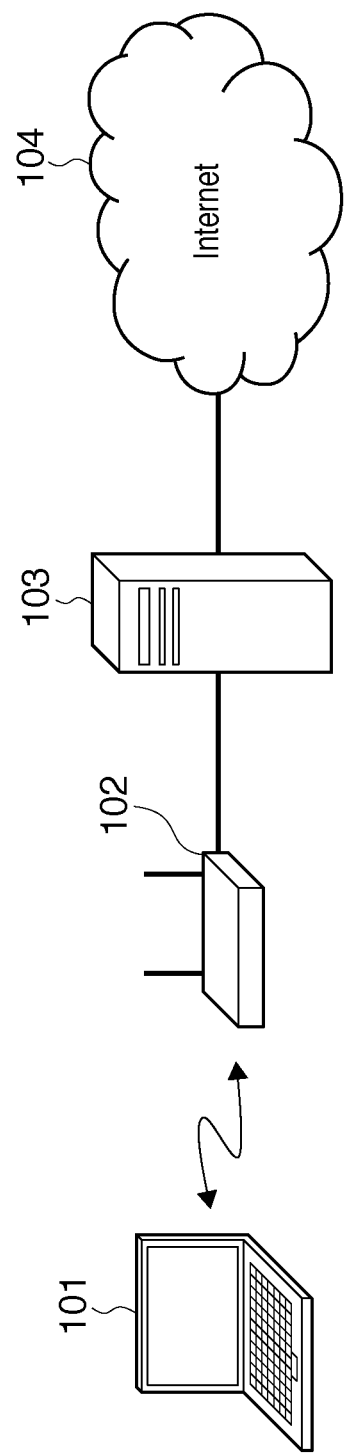
FIG. 1 is a diagram illustrating an example of the configuration of a typical communication system according to Embodiment 1.

FIG. 1 is a diagram illustrating an example of the configuration of a typical communication system according to Embodiment 1. A personal computer (PC) 101 has a function for performing wireless LAN communication according to the IEEE 802.11 standard series and a WPS Enrollee function. An access point (AP) 102 has a function for performing wireless LAN communication and Ethernet® communication, and a WPS Registrar function. An account management server (SRV) 103 has a function for performing Ethernet® communication, a function for managing user accounts (user IDs and passwords, etc.) of a public wireless LAN, and a function for authenticating users and providing communication permission. The Internet 104 is a communication network capable of connecting computers around the world.

The AP 102, the SRV 103 and the Internet 104 are connected with a wired LAN, and the PC 101 is connected to an infrastructure mode wireless network to which the AP 102 belongs. Upon activation of an application for automatically setting wireless parameters in the PC 101, it is checked, by a settings information notification protocol, whether or not the PIN code of the PC 101 and the PIN code of the AP 102 match, and if it is confirmed that they match, the PC 101 can acquire wireless parameters. That is, it can be said that the PIN code is code information used for a wireless parameter setting process, or code information used to determine whether or not to provide wireless parameters in a wireless parameter setting process.

As used herein, the settings information notification protocol refers to a Registration protocol, and EAP packets are used for transmission/reception of various messages. Accordingly, if the ESSIDs and frequency channels of the PC 101 and the AP 102 match, various messages can be transmitted/received by the settings information notification protocol without an encryption or authentication for wireless LAN.

Also, the wireless parameters set by the settings information notification protocol include an ESSID, a frequency channel, an encryption scheme, an encryption key, an authentication scheme, an authentication key, and so on. The PIN code is the abbreviation of Personal Identification Number, and can be a number string, character string, or the like.

The PC 101 and the SRV 103 can communicate with each other through the AP 102. The PC 101 executes authentication of a user (executes user authentication) with the SRV 103, and can connect to the Internet 104 only if the user is successfully authenticated. Accordingly, the PC 101 cannot connect to the Internet 104 even after the PC 101 establishes a connection to the wireless network of the AP 102 until the user is successfully authenticated. The SRV 103 stores a list of valid user accounts (user IDs and passwords, etc.) to execute user authentication. That is, it can be said that a user identifier (user ID) for public wireless LAN, which will be described later, refers to identification information used for user authentication that determines whether or not to permit connection to the Internet as a communication network. Also, it can be said that authentication information (password) for public wireless LAN, which will be described later, refers to authentication information used for user authentication that determines whether or not to permit connection to the Internet as a communication network.

Figure 2:
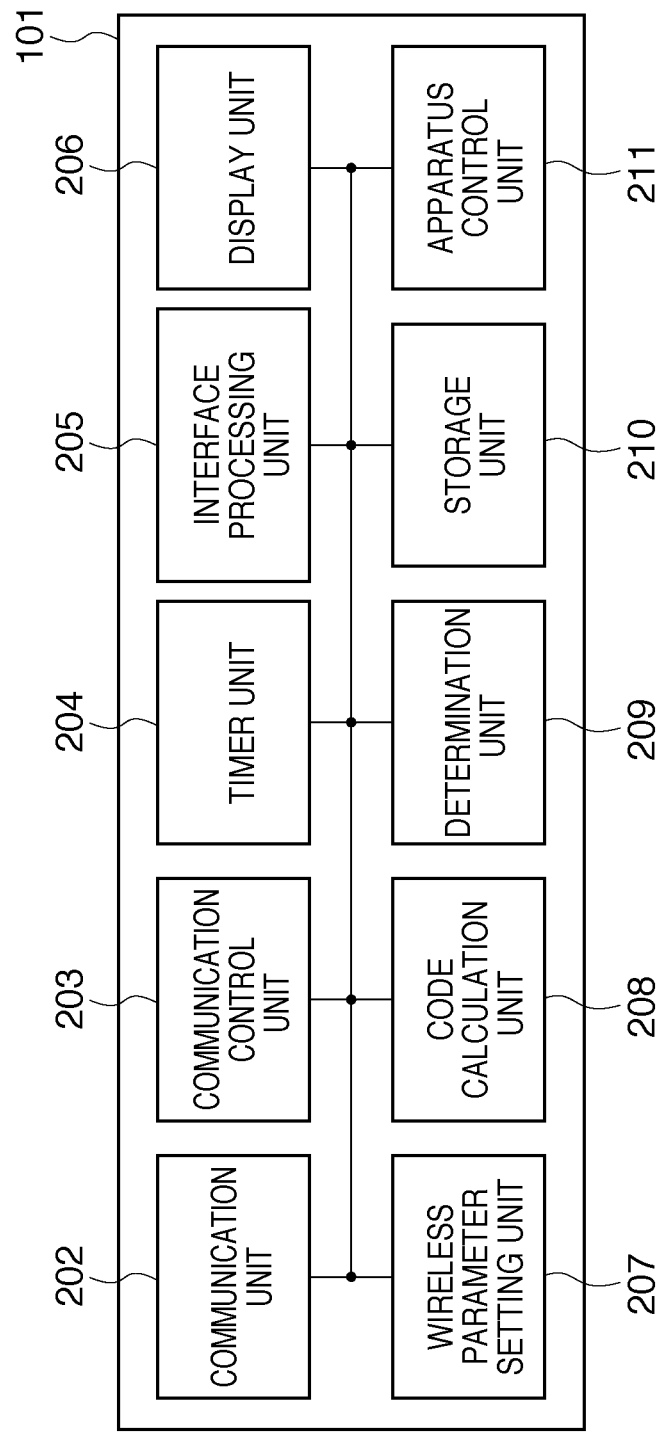
FIG. 2 is a block diagram illustrating an example of the configuration of a personal computer according to Embodiment 1.

Next, a configuration of the PC 101 shown in FIG. 1 will be described with reference to FIG. 2. FIG. 2 is a block diagram illustrating an example of the configuration of the personal computer according to Embodiment 1. In FIG. 2, reference numeral 202 denotes a communication unit that performs wireless communication, and reference numeral 203 denotes a communication control unit that controls the communication unit. Reference numeral 204 denotes a timer unit that performs a timer process and manages time; 205 denotes an interface processing unit that controls various interfaces; 206 denotes a display unit that provides various displays.

Reference numeral 207 denotes a wireless parameter setting unit that sets wireless parameters by a settings information notification protocol; 208 denotes a code calculation unit that calculates various encryptions, hash values, and the like; 209 denotes a determination unit that makes various determinations in a process described later; 210 denotes a storage unit that stores wireless parameters, user account information and the like. The user account information may be stored in devices in advance, or may be inputted by the user. Reference numeral 211 denotes an apparatus control unit that controls the operation of the whole apparatus.

Figure 3:
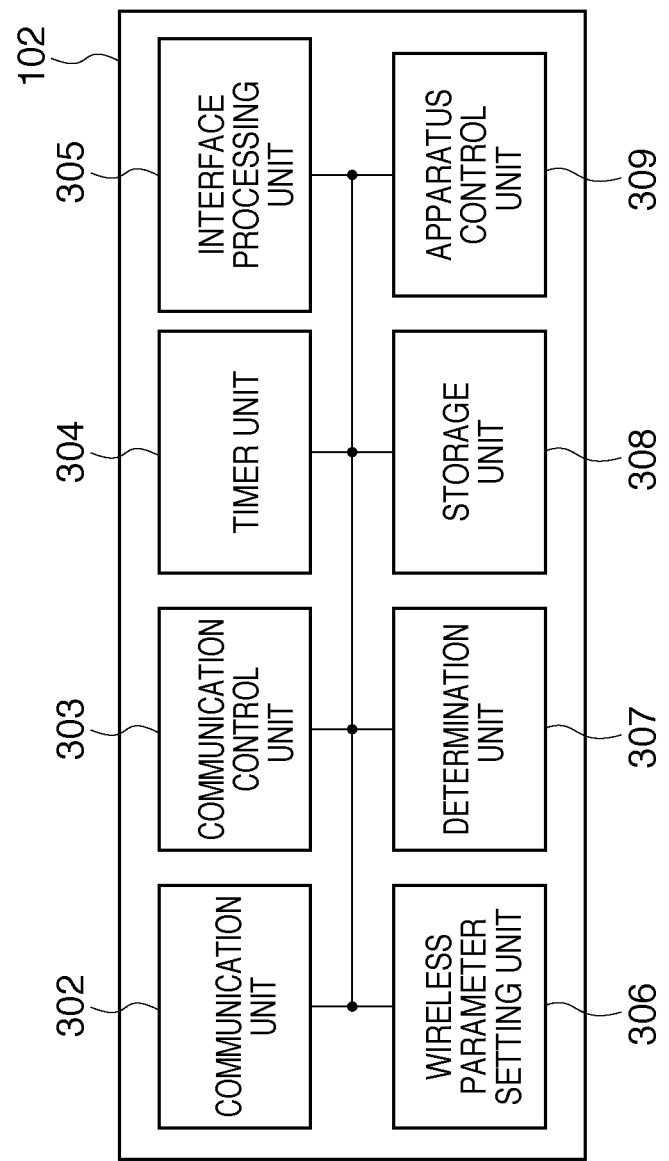
FIG. 3 is a block diagram illustrating an example of the configuration of an access point according to Embodiment 1.

A configuration of the AP 102 shown in FIG. 1 will be described next with reference to FIG. 3. FIG. 3 is a block diagram illustrating an example of the configuration of the access point according to Embodiment 1. In FIG. 3, reference numeral 302 denotes a communication unit that performs wireless communication and wired communication; 303 denotes a communication control unit that controls the communication unit; 304 denotes a timer unit that performs a timer process and manages time; 305 denotes an interface processing unit that controls various interfaces.

Reference numeral 306 denotes a wireless parameter setting unit that sets wireless parameters by a settings information notification protocol; 307 denotes a determination unit that makes various determinations in a process described later; 308 denotes a storage unit that stores wireless parameters, and the like; 309 denotes an apparatus control unit that controls the operation of the whole apparatus.

Figure 4:
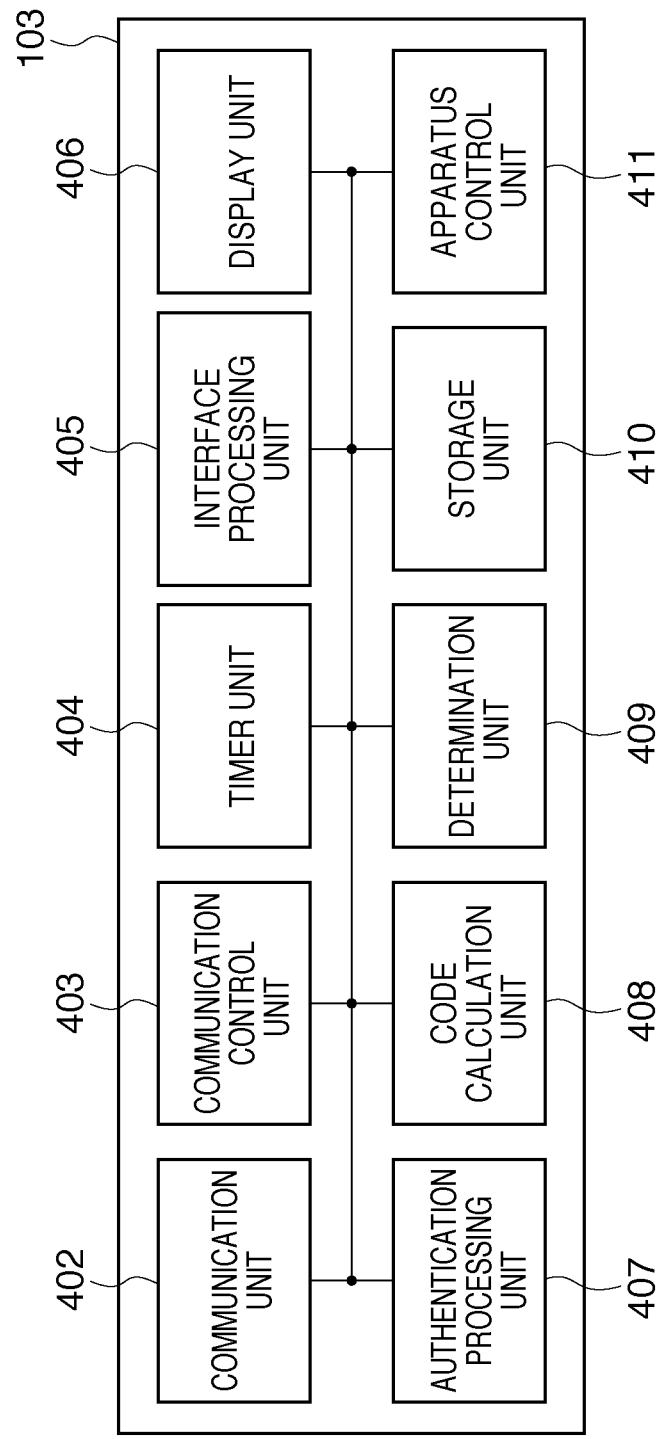
FIG. 4 is a block diagram illustrating an example of the configuration of an account management server according to Embodiment 1.

A configuration of the SRV 103 shown in FIG. 1 will be described next with reference to FIG. 4. FIG. 4 is a block diagram illustrating an example of the configuration of the account management server according to Embodiment 1. In FIG. 4, reference numeral 402 denotes a communication unit that performs wired communication; 403 denotes a communication control unit that controls the communication unit; 404 denotes a timer unit that performs a timer process and manages time; 405 denotes an interface processing unit that controls various interfaces; 406 denotes a display unit that provides various displays.

Reference numeral 407 denotes an authentication processing unit that performs user authentication for public wireless LAN; 408 denotes a code calculation unit that calculates various encryptions, hash values, and the like; 409 denotes a determination unit that makes various determinations in a process described later; 410 denotes a storage unit that stores wireless parameters, user account information and the like; 411 denotes an apparatus control unit that controls the operation of the whole apparatus.

Now, a processing procedure performed by the PC 101 that operates as a wireless communication apparatus to execute a settings information notification protocol will be described with reference to FIG. 5.

Figure 5:
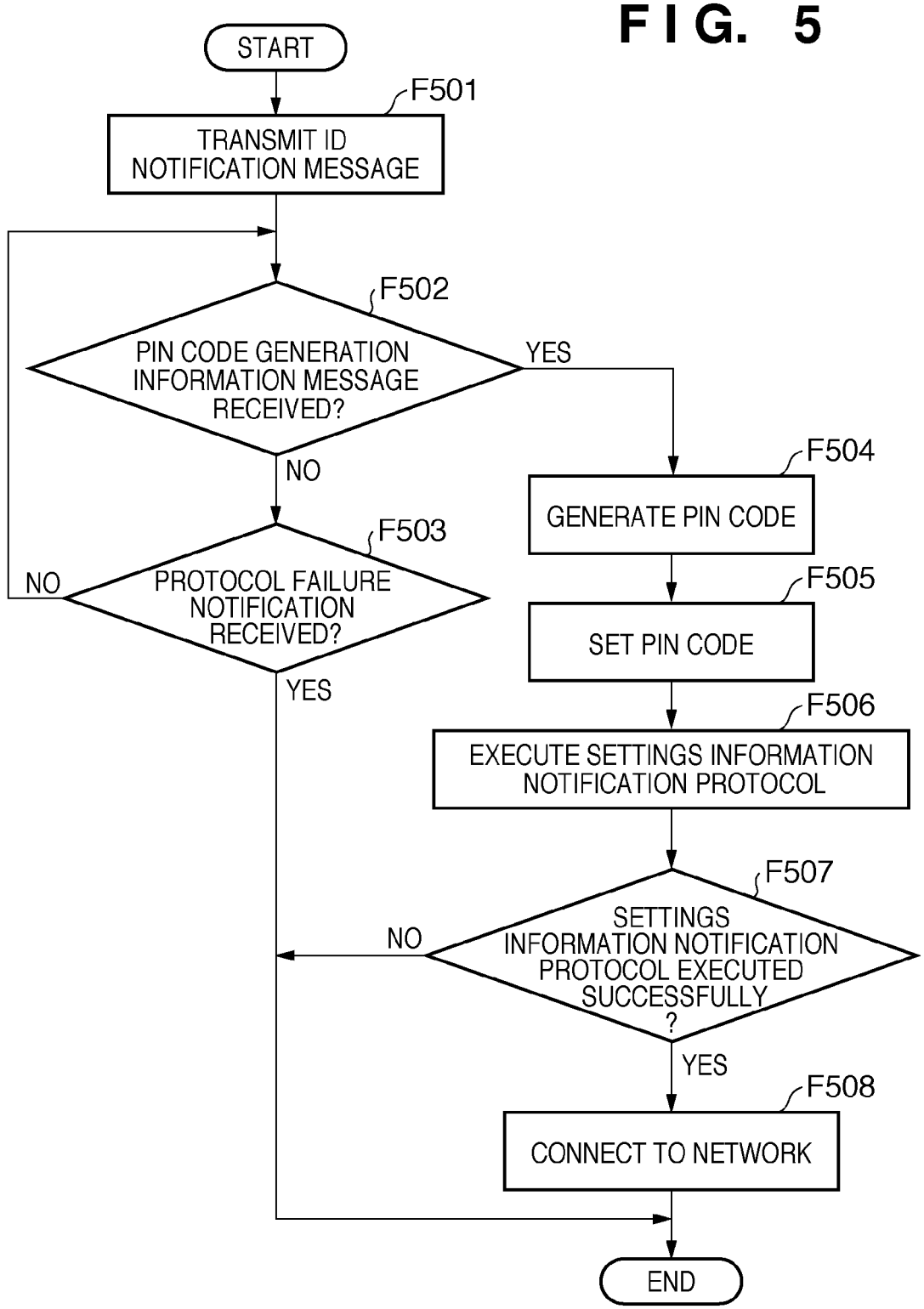
FIG. 5 is a flowchart illustrating a process performed by a wireless communication apparatus according to Embodiment 1.

FIG. 5 is a flowchart illustrating a process performed by the wireless communication apparatus according to Embodiment 1. This process starts when the PC 101 connects to a wireless network to which the AP 102, which operates as a wireless base station apparatus of a public wireless LAN, belongs. At this point in time, the same encryption key, authentication key and the like are not set in the PC 101 and the AP 102. Accordingly, the PC 101 is in a state in which the PC 101 can communicate with the AP 102 using only particular signals (alert signals, EAP packets, etc.) in the wireless network of the AP 102, and cannot perform ordinary data communication using an encryption or authentication. Here, it is assumed that various messages are transmitted/received between the PC 101 and the AP 102 using EAP packets.

The PC 101 transmits, to the AP 102, an ID notification message to which a user identifier (user ID) for public wireless LAN is assigned (F501). After transmitting the ID notification message, the PC 101 waits for reception of a PIN code generation information message or a protocol failure notification from the AP 102 (F502, F503). If the PC 101 receives a protocol failure notification, the PC 101 ends this process.

If, on the other hand, the PC 101 receives a PIN code generation information message, it generates a PIN code based on a random value and authentication information (password) for public wireless LAN that are assigned to the message (F504). The method for generating a PIN code using a random value and a password can be any method such as a method of using a cryptographic algorithm such as RC4 or AES, or a method of using a hash algorithm such as MD5 or SHA1.

After generating the PIN code, the PC 101 sets the PIN code in the application for automatically setting wireless parameters (F505), and then executes a settings information notification protocol using the set PIN code (F506). The settings information notification protocol authenticates mutual validity between the Enrollee and the Registrar by determining whether or not their PIN codes match. Accordingly, the Enrollee can acquire wireless parameters from a Registrar with the same PIN code. Subsequently, after the settings information notification protocol ends, it is determined whether or not the settings information notification protocol has been executed successfully (F507). As used herein, the phrase "the settings information notification protocol has been executed successfully" refers to a state in which the Enrollee has acquired wireless parameters from the Registrar with a PIN code that matches the PIN code of the Enrollee. If it is determined that the settings information notification protocol has failed, the PC 101 ends this process. If, on the other hand, the settings information notification protocol has been executed successfully, the PC 101 connects to the wireless network to which the AP 102 belongs using the acquired wireless parameters (F508). By doing so, the same encryption key, authentication key and the like as those of the AP 102 is set in the PC 101, and therefore, the PC 101 can perform ordinary data communication using an encryption or authentication.

A processing procedure performed by the AP 102 that operates as a wireless base station apparatus to execute a settings information notification protocol will be described next with reference to FIG. 6.

Figure 6:
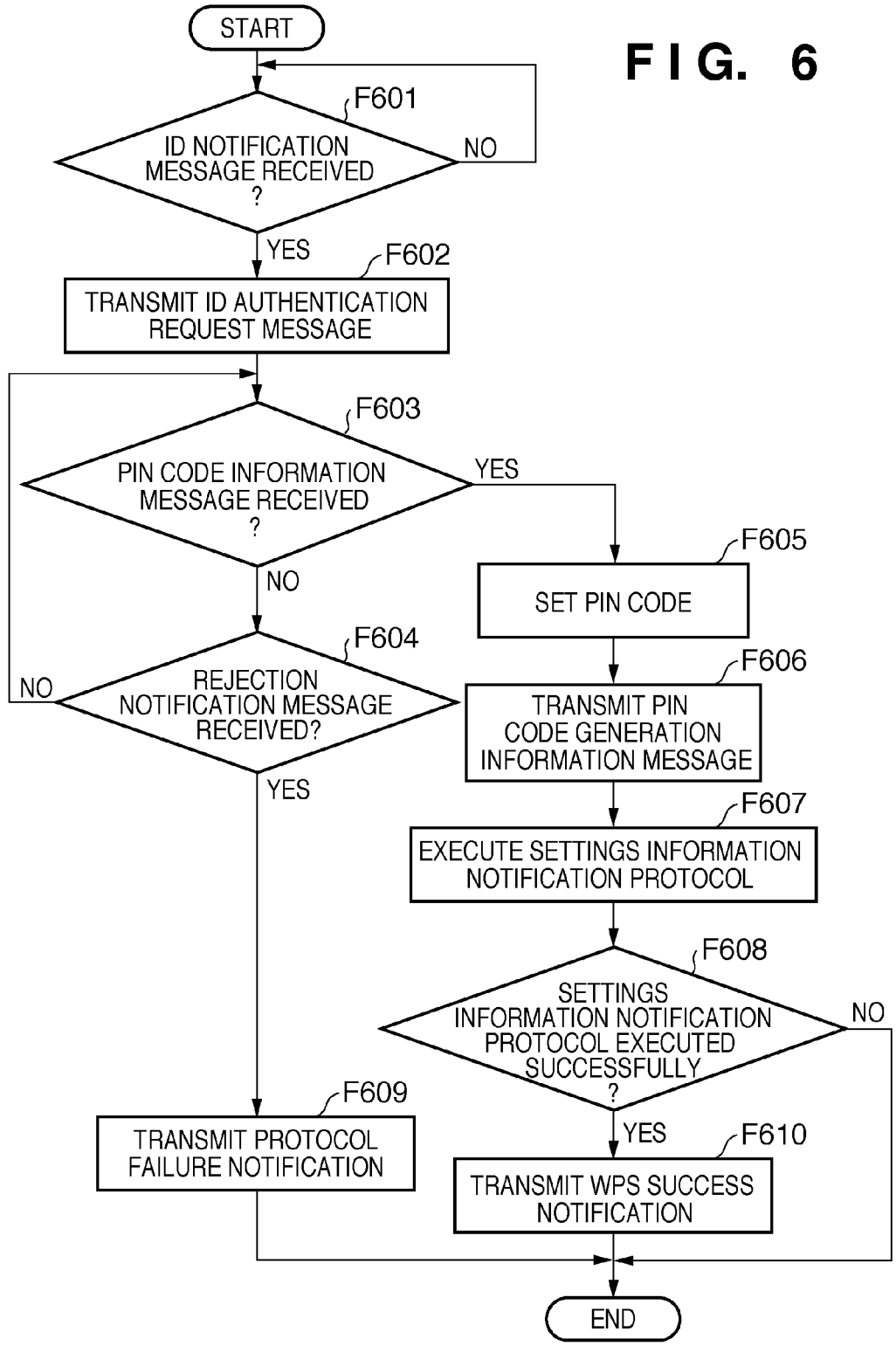
FIG. 6 is a flowchart illustrating a process performed by a wireless base station apparatus according to Embodiment 1.

FIG. 6 is a flowchart illustrating a process performed by the wireless base station apparatus according to Embodiment 1. This process starts when the PC 101 requesting the execution of automatic setting of wireless parameters joins the wireless network to which the AP 102 belongs. At this point in time, the same encryption key, authentication key and the like are not set in the PC 101 and the AP 102. Accordingly, the PC 101 is in a state in which the PC 101 can communicate with the AP 102 using only particular signals (alert signals, EAP packets, etc.) in the wireless network of the AP 102, and cannot perform ordinary data communication using an encryption or authentication. Here, it is assumed that various messages are transmitted/received between the PC 101 and the AP 102 using EAP packets.

The AP 102 waits for reception of an ID notification message from the PC 101 (F601). If the AP 102 receives an ID notification message from the PC 101, the AP 102 assigns the user ID assigned to the message to an ID authentication request message, and transmits the ID authentication request message to the SRV 103 (F602). After transmitting the ID authentication request message, the AP 102 waits for reception of a PIN code information message or a rejection notification message from the SRV 103 (F603, F604). If the AP 102 receives a rejection notification message, it transmits a protocol failure notification to the wireless communication apparatus (F609), and then ends this process.

If, on the other hand, the AP 102 receives a PIN code information message, it sets the PIN code assigned to the message in the application for automatically setting wireless parameters (F605), and then assigns the random value assigned to the PIN code information message to a PIN code generation information message and transmits the PIN code generation information message to the PC 101 (F606). Next, after transmitting the PIN code generation information message, the AP 102 executes the settings information notification protocol with the PC 101 using the set PIN code (F607).

Next, the AP 102 determines whether or not the settings information notification protocol has been executed successfully (F608). As used herein, the phrase "the settings information notification protocol has been executed successfully" refers to a state in which the PIN code of the Registrar and the PIN code of the Enrollee match, and wireless parameters have been provided from the Registrar to the Enrollee. If it is determined that settings information notification protocol has been executed successfully, the AP 102 transmits a WPS success notification to the SRV 103 (F610), and then ends this process. If, on the other hand, the settings information notification protocol fails, the AP 102 ends this process.

A processing procedure performed by the account management server (SRV) 103 that performs user authentication when the PC 101 connects to the Internet 104 will be described next with reference to FIG. 7.

Figure 7:
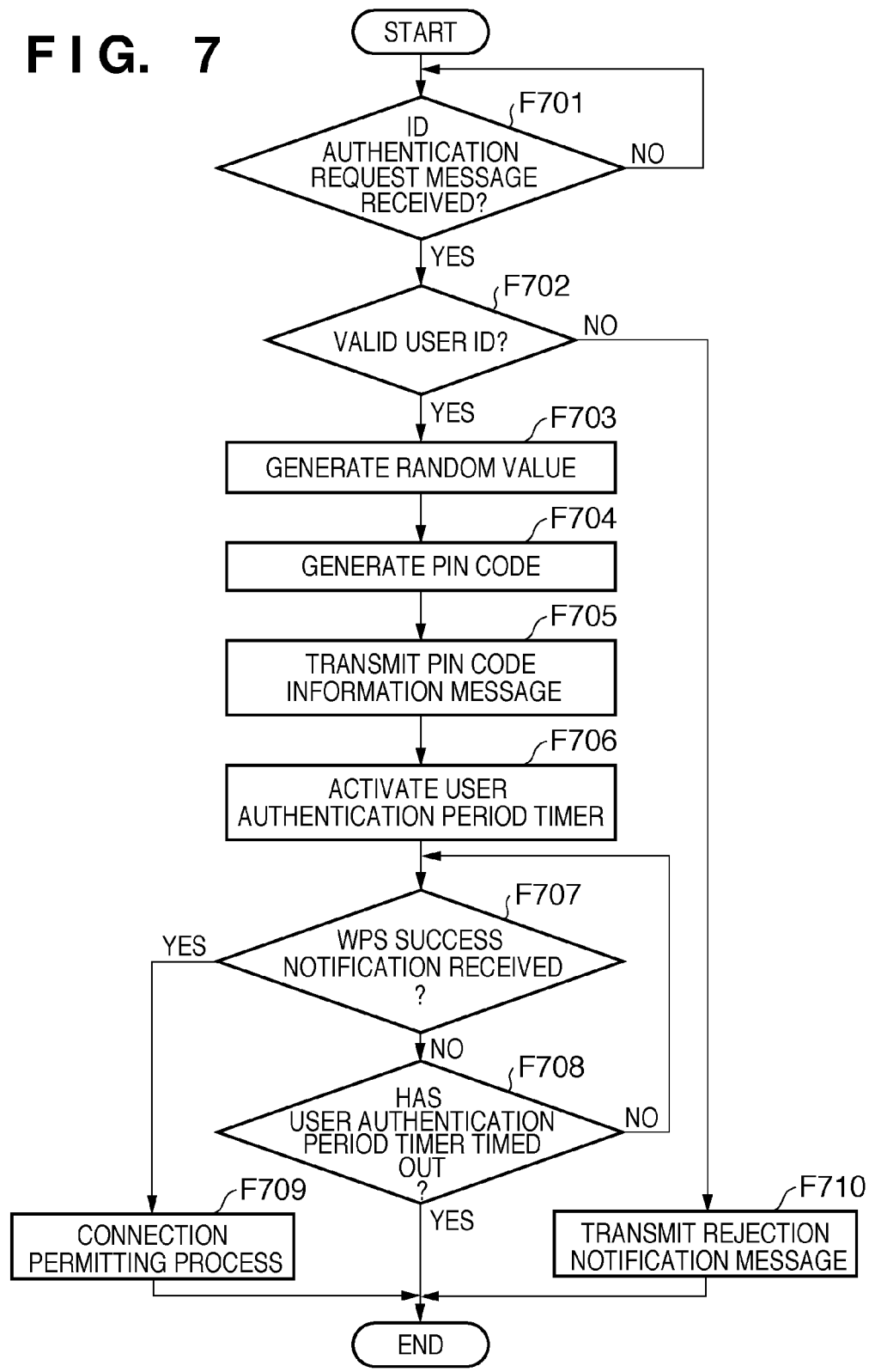
FIG. 7 is a flowchart illustrating a process performed by an account management server according to Embodiment 1.

FIG. 7 is a flowchart illustrating a process performed by the account management server according to Embodiment 1. The SRV 103 waits for reception of an ID authentication request message from the AP 102 (F701). If the SRV 103 receives an ID authentication request message from the AP 102, the SRV 103 checks whether or not the user ID assigned to the message is valid (F702). The method for checking the validity of user IDs can be, for example, a method in which user account information that is stored in the storage unit 410 is referred to, and if a user ID that is the same as the received user ID is found, the received user ID is validated.

If the received user ID is invalid, the SRV 103 transmits a rejection notification message to the AP 102 (F710), and then ends this process. If, on the other hand, the received user ID is valid, the SRV 103 generates a random value (F703). Then, the SRV 103 generates a PIN code using the password corresponding to the received user ID and the generated random value (F704).

After generating the PIN code, the SRV 103 assigns the generated PIN code and the random value used to generate the PIN code to a PIN code information message, and transmits the message to the AP 102 (F705). After transmitting the PIN code information message, the SRV 103 activates a user authentication period timer (F706), and waits for reception of a WPS success notification from the AP 102, or for timeout of the user authentication period timer (F707, F708).

If the user authentication period timer times out, the SRV 103 ends this process. If, on the other hand, the SRV 103 receives a WPS success notification, the SRV 103 performs a process for permitting the PC 101, which transmitted the user ID received in F701, to connect to the Internet 104 (F709), and then ends this process.

A user authentication sequence performed by the PC 101, the AP 102 and the SRV 103 will be described next with reference to FIG. 8.

Figure 8:
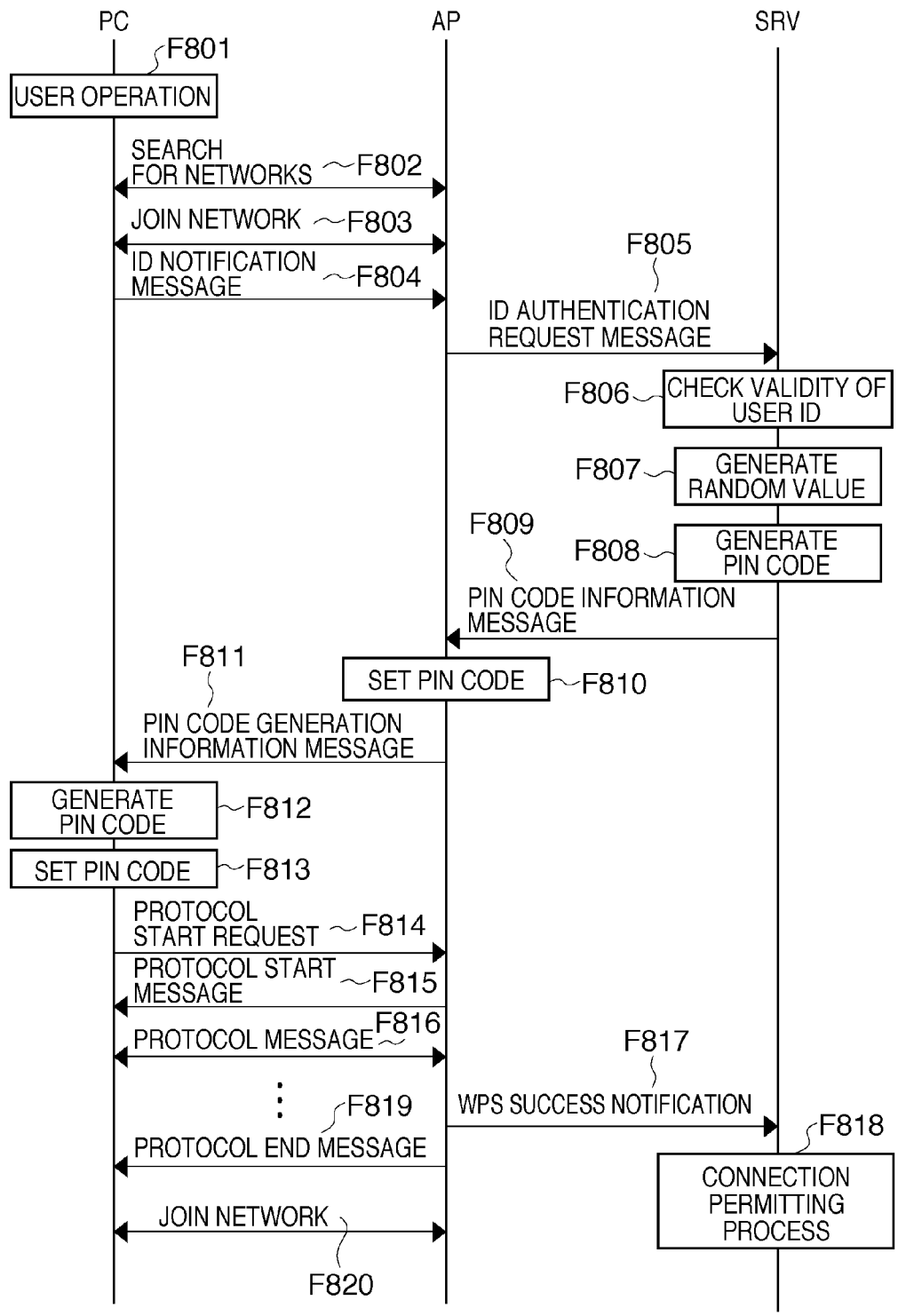
FIG. 8 is a diagram illustrating a user authentication sequence according to Embodiment 1.

FIG. 8 is a diagram illustrating a user authentication sequence according to Embodiment 1. In the PC 101, when an application for automatically setting wireless parameters is activated by a user operation or the like (F801), the PC 101 searches for wireless networks in the surrounding area (F802). Next, a wireless network is automatically or manually selected from among the found wireless networks. In this example, the wireless network of the AP 102 is selected, and the PC 101 joins the wireless network of the AP 102 (F803). However, at this point in time, the same encryption key, authentication key and the like are not set in the PC 101 and the AP 102. Accordingly, the PC 101 is in a state in which the PC 101 can communicate with the AP 102 using only particular signals (alert signals, EAP packets, etc.) in the wireless network of the AP 102, and cannot perform ordinary data communication using an encryption or authentication. Here, it is assumed that various messages are transmitted/received between the PC 101 and the AP 102 using EAP packets.

Next, the PC 101 assigns a user ID to an ID notification message, and transmits the message to the AP 102 (F804). Here, in the case where the PC 101 stores multiple user IDs for public wireless LAN, it is possible to adopt a configuration that permits the user to manually select a user ID, or a configuration in which a user ID is selected automatically based on network information such as an ESSID. If the AP 102 receives the ID notification message, it assigns the user ID assigned to the message to an ID authentication request message, and transmits the ID authentication request message to the SRV 103 (F805). Here, an example is described in which the ID notification message and the ID authentication request message are separate messages, but they may be configured as a single message.

If the SRV 103 receives the ID authentication request message, it checks the validity of the received user ID (F806). After confirming the validity of the received user ID, the SRV 103 generates a random value (F807). After generating the random value, the SRV 103 generates a PIN code using the password corresponding to the received user ID and the generated random value (F808).

Next, after generating the PIN code, the SRV 103 assigns the generated PIN code and the random value to a PIN code information message, and transmits the message to the AP 102 (F809). If the AP 102 receives the PIN code information message, it starts an application for automatically setting wireless parameters, and sets the assigned PIN code in the application for automatically setting wireless parameters (F810). After setting the PIN code, the AP 102 assigns the random value to a PIN code generation information message, and transmits the message to the PC 101 (F811).

If the PC 101 receives the PIN code generation information message, it generates a PIN code using the assigned random value and the password stored in the PC 101 (F812). After generating the PIN code, the PC 101 sets the PIN code in an application for automatically setting wireless parameters (F813). After setting the PIN code, the PC 101 transmits a protocol start request to the AP 102 so as to start the settings information notification protocol (F814).

If the AP 102 receives the protocol start request from the PC 101, it transmits a protocol start message to the PC 101 (F815). Then, the PC 101 and the AP 102 exchange protocol messages in accordance with the WPS Registration protocol (F816). Here, the wireless parameters of the AP 102 are transmitted to and set in the PC 101 only if it is confirmed by both the PC 101 and the AP 102 that the PIN code set in the PC 101 and the PIN code set in the AP 102 match.

Next, if the AP 102 confirms that its PIN code and the PIN code set in the PC 101 match, it transmits a WPS success notification to the SRV 103 (F817). If the SRV 103 receives the WPS success notification, it performs a process for permitting the PC 101 to connect to the Internet 104 (F818). After completion of the settings information notification protocol, the AP 102 transmits a protocol end message to the PC 101 (F819).

If the PC 101 receives the protocol end message, it temporarily disconnects from the network, and reconnects to the wireless network of the AP 102 using the wireless parameters acquired from the AP 102 (F820). Here, because the same encryption key, authentication key and the like as the AP 102 are set in the PC 101, ordinary data communication using an encryption or authentication is possible. The SRV 103 permits the PC 101 to connect to the Internet 104, and the PC 101 can connect to the Internet 104 through the AP 102.

According to Embodiment 1, it becomes possible to safely and automatically set the same PIN code in a wireless communication apparatus and a wireless base station apparatus that execute a wireless parameter setting scheme in a public wireless LAN.

In addition, because a PIN code to be set is generated based on a random value and a password, a different PIN code is generated each time, and therefore, a high level of security is achieved.

Furthermore, because the password is used only within the wireless communication terminal and the account management server, the password will not be leaked to the outside of the wireless base station apparatus and the like, and therefore, a high level of security is achieved.

In addition, in a wireless parameter setting scheme, by regarding the matching of PIN codes as the matching of passwords instead of performing user authentication, it is possible to permit the wireless communication apparatus to connect to the Internet.

Accordingly, the user's task of setting a PIN code in the wireless communication apparatus and an access point of a public wireless LAN as well as the user's task of undergoing user authentication can be eliminated, and as a result, user operability is improved.

Embodiment 2

Next, Embodiment 2 of the present invention will be described in detail with reference to the drawings.

The configurations of a communication system, a PC, an AP and a SRV according to Embodiment 2 are the same as those of Embodiment 1 described above with reference to FIGS. 1 to 4, and thus, descriptions thereof are omitted here.

A processing procedure performed by the PC 101 that operates as a wireless communication apparatus to execute a settings information notification protocol will be described with reference to FIG. 9.

Figure 9:
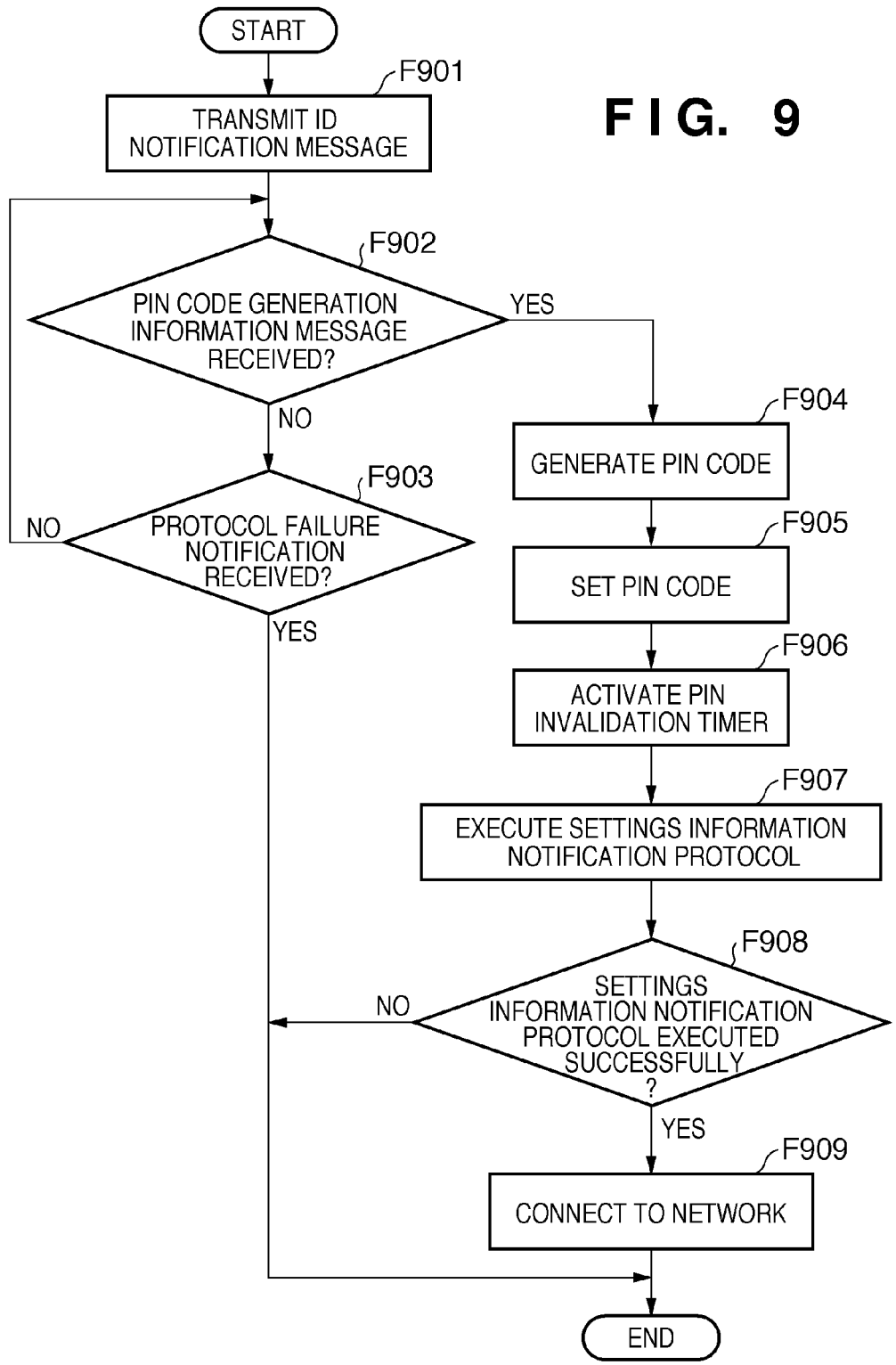
FIG. 9 is a flowchart illustrating a process performed by a wireless communication apparatus according to Embodiment 2.

FIG. 9 is a flowchart illustrating a process performed by the wireless communication apparatus according to Embodiment 2. The processes spanning from F901 to F905 are the same as those of F501 to F505 shown in FIG. 5, and thus, descriptions thereof are omitted here.

Similar to Embodiment 1, the PC 101 sets a PIN code in the application for automatically setting wireless parameters (F905), and activates a PIN invalidation timer (F906). Specifically, the PIN invalidation timer is activated based on time information assigned to a PIN code generation information message sent from the AP 102. The time information can be a time period after which the PIN is invalidated. When the PIN invalidation timer times out, the processing of the application for automatically setting wireless parameters is suspended, and then this process ends.

The subsequent processes (F907 to F909) are the same as F506 to F508 of Embodiment 1, and thus, descriptions thereof are omitted here.

A processing procedure performed by the AP 102 that operates as a wireless base station apparatus to execute a settings information notification protocol will be described next with reference to FIG. 10.

Figure 10:
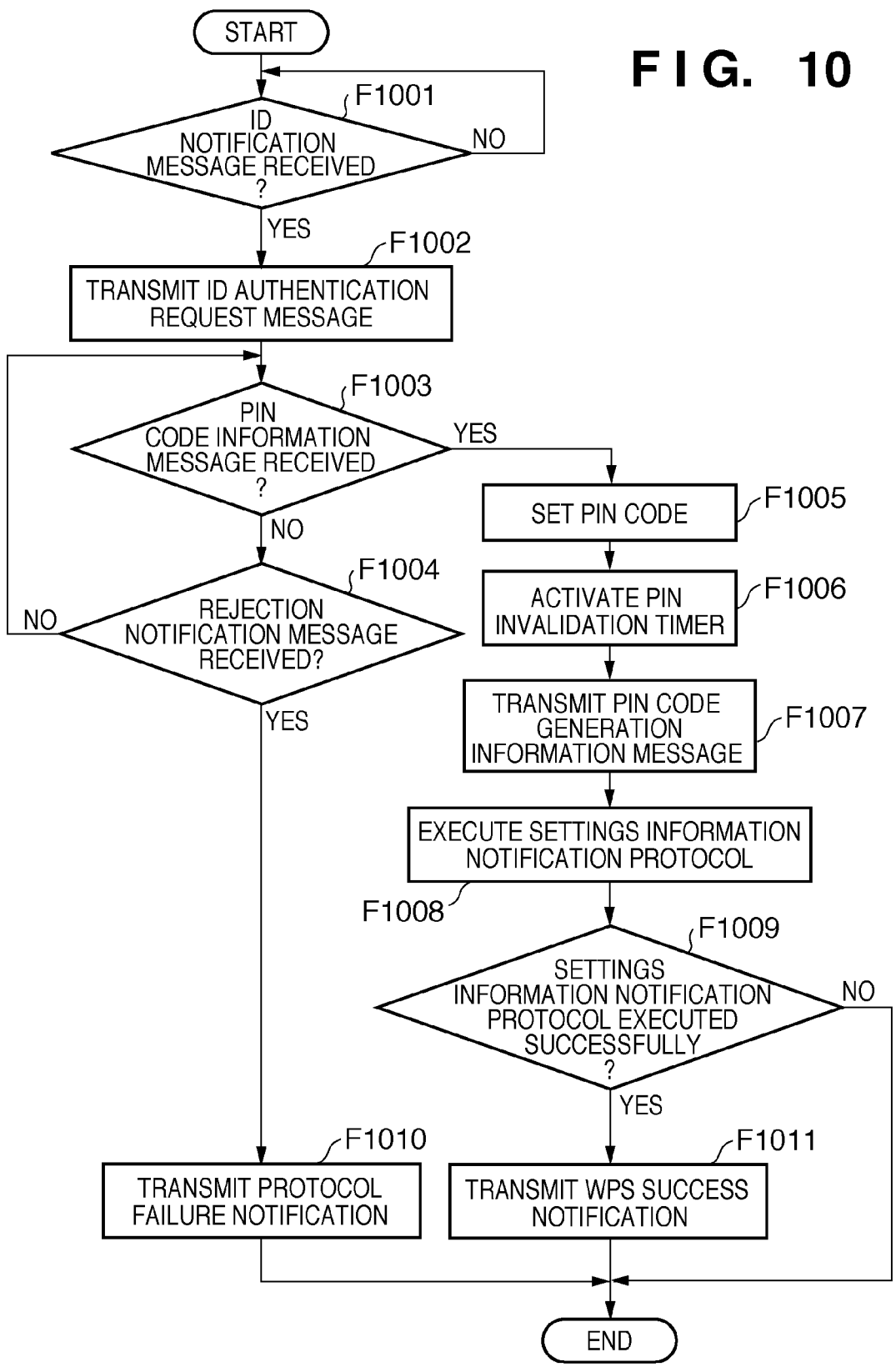
FIG. 10 is a flowchart illustrating a process performed by a wireless base station apparatus according to Embodiment 2.

FIG. 10 is a flowchart illustrating a process performed by the wireless base station apparatus according to Embodiment 2. Because the processes spanning from F1001 to F1005 are the same as those of F601 to F605 shown in FIG. 6, descriptions thereof are omitted here.

Similar to Embodiment 1, the AP 102 sets a PIN code in the application for automatically setting wireless parameters (F1005), and activates a PIN invalidation timer (F1006). Specifically, the PIN invalidation timer is activated based on time information assigned to a PIN code information message sent from the SRV 103. When the PIN invalidation timer times out, the processing of the application for automatically setting wireless parameters is forcibly suspended, and then this process ends. Next, the AP 102 assigns the received time information to a PIN code generation information message, and transmits the message to the PC 101 (F1007).

The subsequent processes (F1008 to F1011) are the same as F607 to F610 of Embodiment 1, and thus, descriptions thereof are omitted here.

A processing procedure performed by the account management server (SRV) 103 that performs user authentication when the PC 101 connects to the Internet 104 will be described next with reference to FIG. 11.

Figure 11:
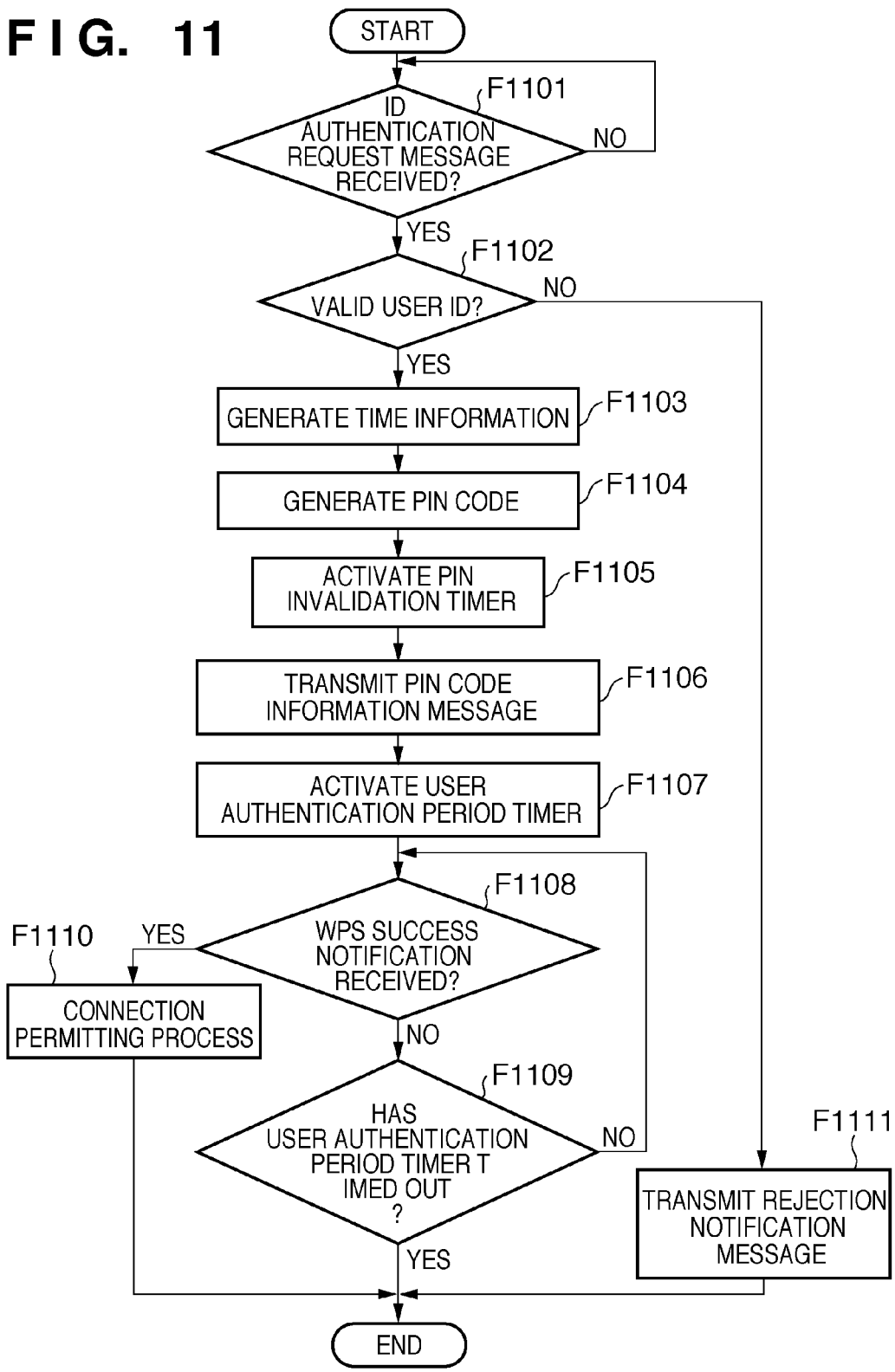
FIG. 11 is a flowchart illustrating a process performed by an account management server according to Embodiment 2.

FIG. 11 is a flowchart illustrating a process performed by the account management server according to Embodiment 2. Because the processes spanning from F1101 to F1102 and the process of F1111 are the same as those of F701 to F702 and F710 shown in FIG. 7, descriptions thereof are omitted here.

Similar to Embodiment 1, the SRV 103 generates time information to be transmitted to the AP 102 if the received user ID is valid (F1103). After generating the time information, the SRV 103 generates a PIN code using the password corresponding to the user ID received from the AP 102 and the generated time information (F1104). After generating the PIN code, the SRV 103 activates a PIN invalidation timer using the generated time information (F1105). When the PIN invalidation timer times out, the authentication process is forcibly suspended, and then this process ends.

Next, the SRV 103 assigns the generated PIN code and the time used to generate the PIN code to a PIN code information message, and transmits the message to the AP 102 (F1106).

The subsequent processes (F1107 to F1110) are the same as F706 to F709 of Embodiment 1, and thus, descriptions thereof are omitted here.

A user authentication sequence performed by the PC 101, the AP 102 and the SRV 103 will be described next with reference to FIG. 12.

Figure 12:
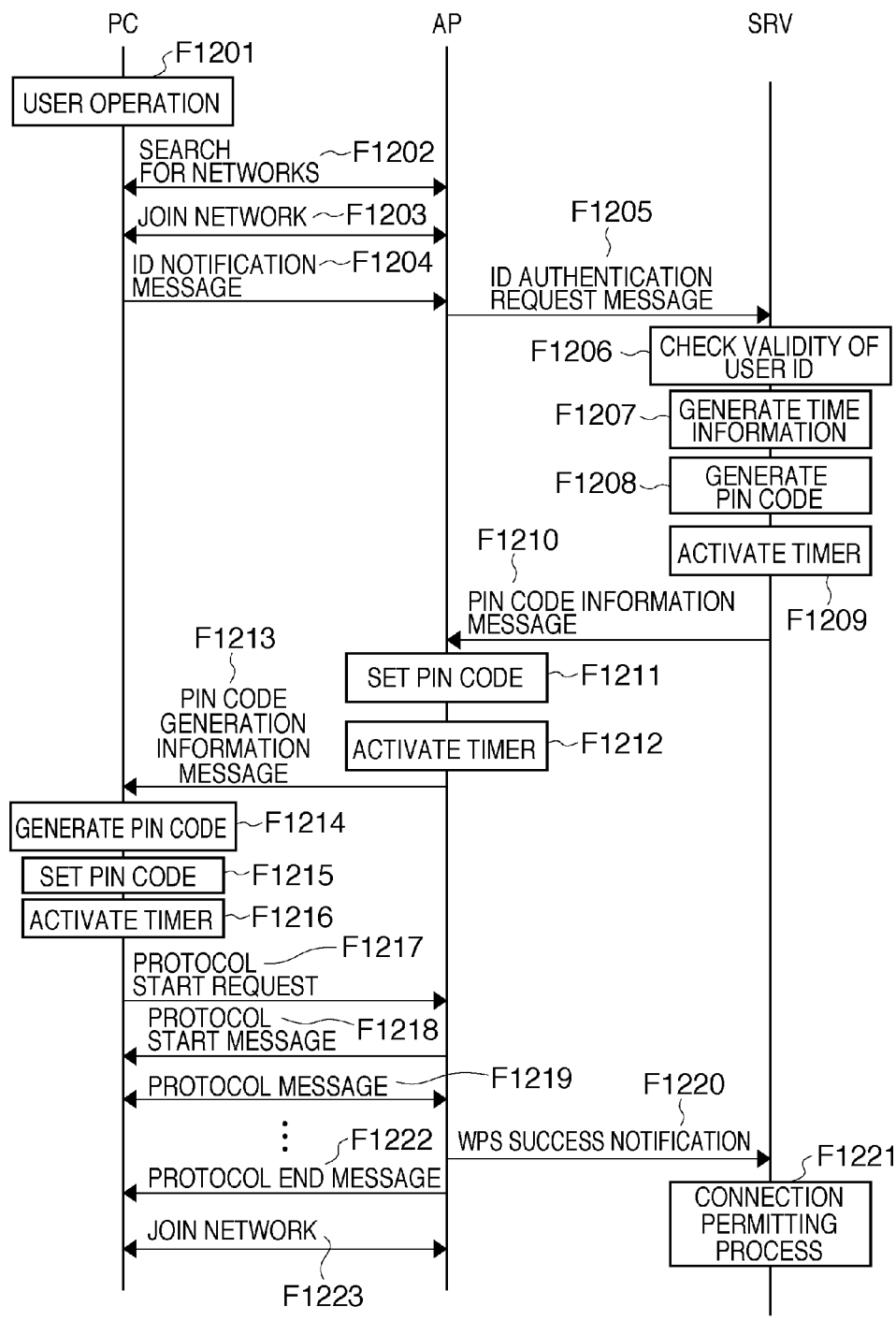
FIG. 12 is a diagram illustrating a user authentication sequence according to Embodiment 2.

FIG. 12 is a diagram illustrating a user authentication sequence according to Embodiment 2. The processes spanning from F1201 to F1206 are the same as those of F801 to F806 shown in FIG. 8, and thus, descriptions thereof are omitted here.

Similar to Embodiment 1, the SRV 103 checks the validity of the received user ID, and generates time information that is a feature of Embodiment 2 (F1207). After generating the time information, the SRV 103 generates a PIN code using the password corresponding to the received user ID and the generated time information (F1208). Next, after generating the PIN code, the SRV 103 activates a PIN code invalidation timer using the time information (F1209). After activating the PIN code invalidation timer, the SRV 103 assigns the generated PIN code and the time information to a PIN code information message, and transmits the message to the AP 102 (F1210).

If the AP 102 receives the PIN code information message, it starts the application for automatically setting wireless parameters, and sets the assigned PIN code in the application for automatically setting wireless parameters (F1211). Next, after setting the PIN code, the AP 102 activates the PIN code invalidation timer using the assigned time information (F1212). Then, after activating the PIN code invalidation timer, the AP 102 assigns the time information to a PIN code generation information message, and transmits the message to the PC 101 (F1213).

If the PC 101 receives the PIN code generation information message, it generates a PIN code using the assigned time information and the password stored in the PC 101 (F1214). After generating the PIN code, the PC 101 sets the PIN code in the application for automatically setting wireless parameters (F1215). After setting the PIN code, the PC 101 activates the PIN code invalidation timer using the assigned time information (F1216). After setting the PIN code invalidation timer, the PC 101 transmits a protocol start request to start the settings information notification protocol to the AP 102 (F1217).

The subsequent processes (F1217 to F1223) in this sequence are the same as F814 to F820 of Embodiment 1, and thus, descriptions thereof are omitted here.

According to Embodiment 2, by providing a validity period to the PIN code, in addition to the effects of Embodiment 1, it is possible to prevent a single PIN code from being continuously set for a long time between a wireless communication terminal and a wireless base station apparatus. In addition, because the validity period can be set to expire substantially at the same time in the apparatuses, it is possible to prevent mismatching of valid PIN codes stored in the apparatuses. Accordingly, the possibility of success in automatically setting wireless parameters with unintended devices can be reduced.

Embodiments 1 and 2 have been described in the context of using an IEEE 802.11 wireless LAN as an example, but these embodiments are applicable to other wireless communication schemes such as wireless USB, Bluetooth®, UWB (Ultra Wide Band), etc.

It goes without saying that the object of the present invention can also be achieved by supplying, to a system or apparatus, a recording medium in which the program code for software that realizes the functions of the above-described embodiments has been recorded, and causing a computer (CPU or MPU) of the system or apparatus to read out and execute the program code stored in the recording medium.

In such a case, the program code itself read out from the computer-readable recording medium realizes the functions of the above-described embodiments, and the present invention is configured of the recording medium in which the program code is stored.

Examples of a recording medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the above-described embodiments by a computer executing the read-out program code. That is, the case where an operating system (OS) or the like running on a computer performs part or all of the actual processing based on instructions of the program code, and the functions of the above-described embodiments are realized by that processing.

Furthermore, needless to say, the case in which the program code read out from the recording medium is written into a memory included in a function expansion board inserted into the computer, a function expansion unit connected to the computer, or the like, a CPU or the like included in the function expansion board or function expansion unit then performs all or part of the actual processing based on instructions of the program code, and the functions of the above-described embodiments are implemented through that processing, is also included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-095432, filed on Apr. 1, 2008, which is hereby incorporated by reference herein in its entirety.

The invention claimed is:

1. A control method for a communication system comprising a wireless communication apparatus, a base station that performs wireless communication with the wireless communication apparatus and connects to a communication network, and a management apparatus, the method comprising:
at the wireless communication apparatus,
transmitting a user identifier to the management apparatus;
at the management apparatus,
generating first code information that is used to authenticate the wireless communication apparatus by the base station, based on authentication information that corresponds to the user identifier transmitted from the wireless communication apparatus and code generation information, and
transmitting the generated first code information to the base station;
transmitting the code generation information to the wireless communication apparatus;
at the wireless communication apparatus,
generating second code information based on the code generation information transmitted from the management apparatus;
at the base station,
authenticating the wireless communication apparatus by checking whether or not the first code information transmitted from the management apparatus and the second code information generated by the wireless communication apparatus match, wherein the authenticating is for determining whether or not a provision of a wireless parameter to the wireless communication apparatus is to be performed; and
providing the wireless parameter to the wireless communication apparatus in a case that it is confirmed that the first code information and the code information generated by the wireless communication apparatus match; and
at the management apparatus,
determining whether or not the provision of the wireless parameter from the base station to the wireless communication apparatus is successful,
permitting the wireless communication apparatus to connect to the communication network, in a case that the provision is successful, and
prohibiting the wireless communication apparatus to connect to the communication network in a case that the provision is not successful.

2. A management apparatus comprising:
a receiver which receives a user identifier from a wireless communication apparatus through a base station which connect to a communication network;
a processor which generates first code information that is used to authenticate the wireless communication apparatus by the base station, wherein the generation unit generates the first code information using authentication information that corresponds to the user identifier and code generation information;
a first transmitter which transmits the first code information to the base station;
a second transmitter which transmits the code generation information to the wireless communication apparatus via the base station;
wherein the processor is configured to determine whether or not the base station provides a wireless parameter to the wireless communication apparatus, wherein the wireless parameter is for performing wireless communication between the wireless communication apparatus and the base station, wherein the base station performs the authentication based on the first code information and second code information generated by the wireless communication apparatus based on the code generation information; and
wherein the processor is configured to permit the wireless communication apparatus to connect to the communication network in a case that the wireless communication parameter is successfully set, and is configured to prohibit the wireless communication apparatus to connect to the communication network in a case that the wireless communication parameter is not successfully set.

3. The apparatus according to claim 2, wherein the code generation information is a numerical value generated at random or character string information.

4. The apparatus according to claim 2, wherein the code generation information is information indicative of time.

5. The apparatus according to claim 4, wherein the processor is configured to set a validity period for the code information based on the code generation information.

6. A non-transitory computer-readable recording medium recording a program for causing a computer to function as the account management apparatus according to claim 2.

* * * * *